United States Patent [19]
Sohngen

[11] 3,968,365
[45] July 6, 1976

[54] FILM SENSOR FOR AN X-RAY FILM LOADER

[75] Inventor: Edwin L. Sohngen, Cincinnati, Ohio

[73] Assignee: Sybron Corporation, Rochester, N.Y.

[22] Filed: Jan. 29, 1975

[21] Appl. No.: 544,875

[52] U.S. Cl. ............................. 250/338; 250/353; 250/468; 250/475
[51] Int. Cl.² ..................................... G01J 1/00
[58] Field of Search .......... 250/338, 339, 353, 439, 250/454, 468, 475, 477

[56] References Cited
UNITED STATES PATENTS 3,775,613  11/1973  Hommerin .................... 250/468

Primary Examiner—Davis L. Willis
Attorney, Agent, or Firm—Theodore B. Roessel; J. Stephen Yeo

[57] ABSTRACT

A non-contact film sensor is provided for an automatic X-ray film loader. The sensor includes an infrared source having an output which is filtered to be outside the spectral sensitivity of the X-ray film. The sensor may be used to monitor a supply magazine and also to determine the presence of film in a film path.

1 Claim, 6 Drawing Figures

FILM SENSOR FOR AN X-RAY FILM LOADER

BACKGROUND OF THE INVENTION

This invention relates to radiography and more particularly to apparatus for handling cut sheets of X-ray film. X-ray film loaders are known in which sheets of X-ray film are automatically moved one at a time from a supply magazine to an exposed station where they are clamped between image intensifier plates. After the film is exposed it is then moved automatically to a receiving magazine. An improved system of this sort is disclosed in a copending U.S. patent application, Ser. No. 528,136, filed Nov. 29, 1974 for X-Ray Film Loader by G. Louis Reser.

It is desirable to provide sensing means to determine the presence or absence of film in the supply magazine and/or along the film path between supply and receiver magazine.

SUMMARY OF THE INVENTION

An X-ray film sensor is provided for use in combination with an automatic X-ray film sensor. The sensor includes a source emitting infrared radiation outside X-ray film sensitivity. A filter may be used to selectively cut off unwanted wavelengths. A detector is maintained in infrared communication with the source producing a signal. The presence of a film will break the infrared communication stopping the signal.

DETAILED DESCRIPTION OF THE DRAWINGS

An X-ray film loader suitable for practicing the invention is disclosed in copending application, Ser. No. 528,136, filed Nov. 29, 1974; X-Ray Film Loader for G. Louis Reser. In the following description elements 10 through 22 were previously set forth in the above-identified Reser application.

Figure 1:
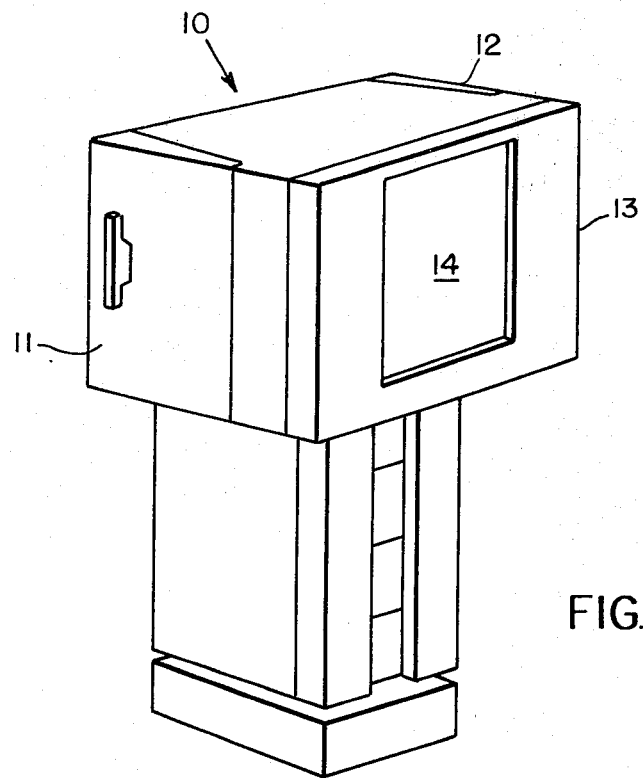
FIG. 1 is a prospective view of an automatic X-ray film loader in which this invention may be utilized.
Figure 2:
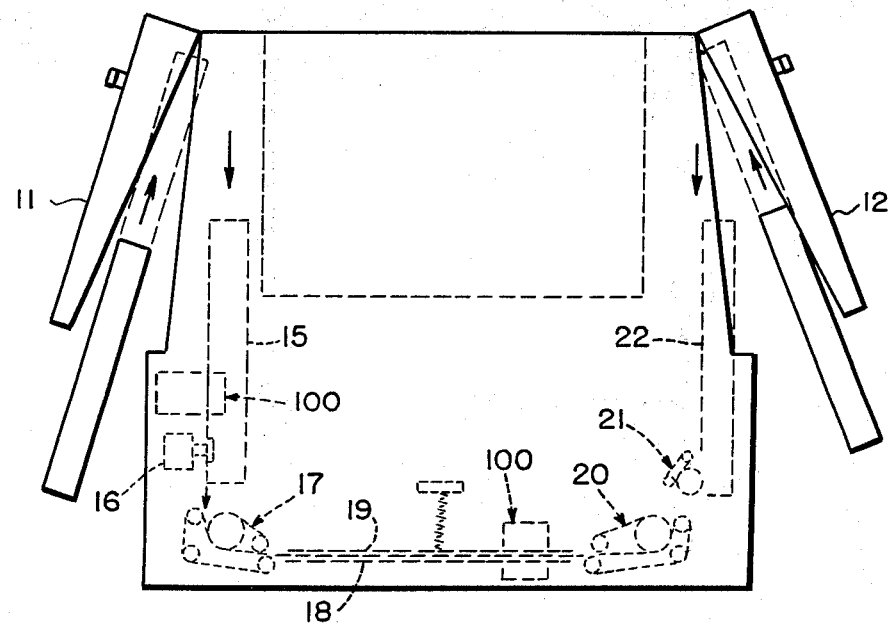
FIG. 2 is a plane view of the loader in FIG. 1 illustrating the movement invention of film through the system and two of the possible locations of the film sensors.

The automatic X-ray film loader 10 illustrated in FIG. 1 has a door 11 on one side for insertion of a supply magazine loaded with cut sheets of X-ray film, a second door 12 on the other side for insertion of an empty receiver magazine in which the exposed film is stored, and a third door 13 on the front of the loader that can be opened to provide access to the intensifier plates and the various film transports utilized in the system. An X-ray transparent window 14 in the front door 13 defines an exposure station where the patient is positioned. Referring to FIG. 2, as the loading door 11 is closed and locked, a supply magazine 15 is automatically moved into position next to a pick-up or film separator assembly 16. At the same time, a door in the magazine is opened so that the sheets of film may be pulled from the magazine. The pick-up assembly 16, which is shown in more detail in the copending application of Edwin L. Sohngen, Ser. No. 382,048, filed July 23, 1973, feeds sheets of X-ray film one at a time to an input film transport 17 that carries the sheets to the exposure station, where they are clamped between a fixed intensifier plate 18 and a movable intensifier plate 19. After the film is exposed, an exit film transport 20 carries the film to a receiver loading transport 21, which deposits the film in a receiver magazine 22.

The film sensor 100 of the present invention is arranged with supply magazine 15 to generate a supply magazine empty signal and arranged with the film path defined by the plates 18 and 19 to sense the transport of film.

Figure 3:
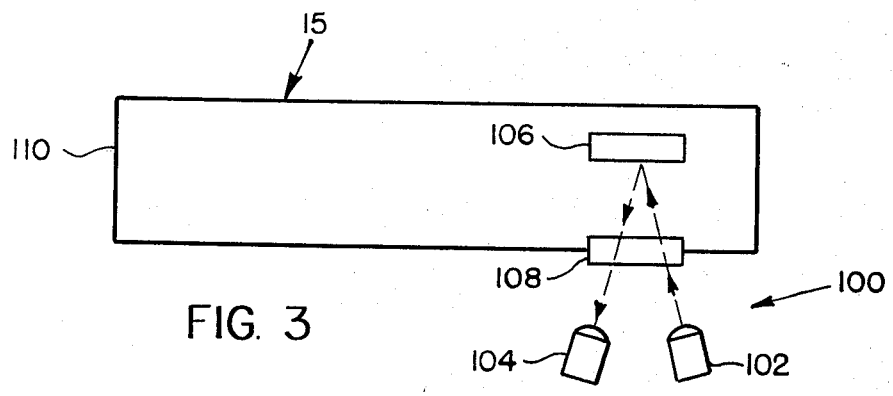
FIGS. 3 and 4 illustrate the invention as applied to sense the presence of film in a film supply magazine.
Figure 4:
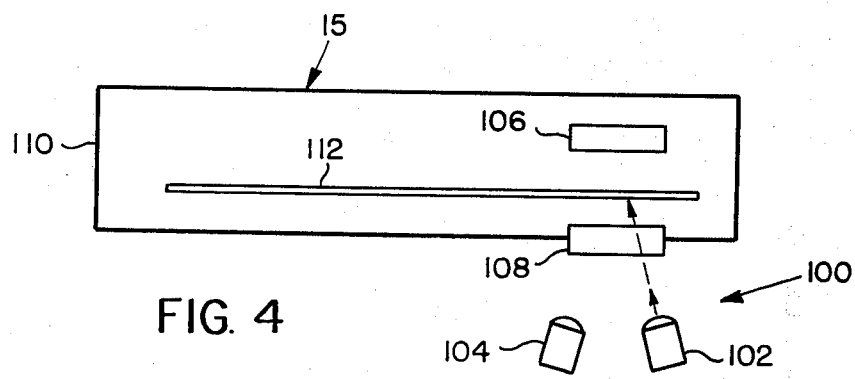
Figure 5:
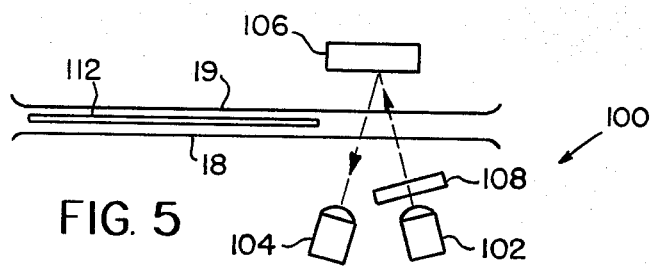
FIGS. 5 and 6 illustrate the invention as applied to sense the presence of film in a predetermined film path.
Figure 6:
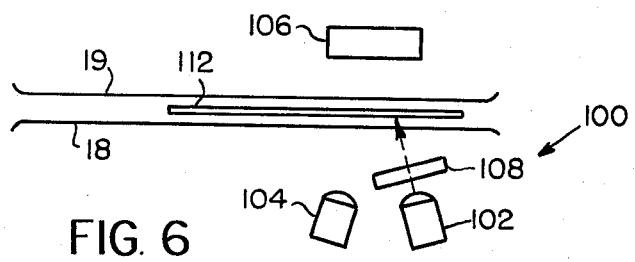

The first arrangement is shown in detail in FIGS. 3 and 4 while the second arrangement is shown in FIGS. 5 and 6.

Both arrangements will now be discussed with reference to these figures.

The invention takes advantage of the known insensitivity of screen type radiographic films to radiation having wavelengths greater than 650 nanometers. According to the invention, an infrared source 102 is provided. A GaAs light emitting diode having a peak spectral emission above 650 nanometers may be used such as a General Electric SSC-56 infrared solid state lamp as it has a peak spectral emission at 940 nanometers.

A suitable infrared detector 104 such as a General Electric L14G1 phototransistor is arranged to be in infrared communication with the source in the absence of film in the infrared path. Thus, the source 102 and the detector 104 may be arranged on opposing sides of the film or film path. The preferred way however, is to mount both the source 102 and the detector 104 on the same side of the film.

A packaged assembly including both a source and detector mounted together is the Model SPX-1180-2 available from Spectromes Inc., Richardson Texas 75080, sold as an object sensor.

A reflective surface or mirror 106 is arranged on the opposite side of the film or film path so as to reflect infrared radiation from the source to the detector.

While the peak emission of the source is selected to be outside the spectral sensitivity of the film, some of the emission may fall within the film's sensitivity range. As an additional feature of the invention, a low pass (high wavelength) or bandpass filter 108 is provided to eliminate the unwanted radiation which would tend to fog a film. A Kodak 88A Wratter filter is used by the applicant for this purpose.

The energy produced by the source 102 is directed through the filter 108 and is then directed on to mirror 106. When no film is present in the infrared path, the mirror 102 redirects the energy back to the detector 104 which produces an electrical signal when hit with the reflected energy. This signal can then be used in conjunction with other electronics to produce control functions.

Limiting our attention to FIGS. 3, there is seen a supply magazine 15 having a light tight enclosure 110. The enclosure has an opening into which filter 108 is fitted. The dotted line represents the path of the infrared emission. With no film in the enclosure infrared energy is reflected from mirror 106 to detector 104 which produces a signal in response.

FIG. 4 illustrates the supply magazine having a film 112 in the enclosure. The film 112 absorbs the infrared energy preventing infrared energy from reaching the detector.

Thus, when a piece of film is introduced between the filter 108 and mirror 106 the energy path is blocked and no radiation can be redirected onto the detector 104. The result of this action is no signal from the detector 104. Therefore, the detector 104 becomes a device which will establish the presence or absence of film within the optical path. The filter keeps all unwanted light wavelengths from hitting the film.

FIGS. 5 and 6 illustrate the sensor 100 being applied to determine the presence or absence of film 112 in a film path such as could be defined by plates 18 and 19. The elements of the sensor would be placed adjacent to the plates so that the infrared radiation would not be blocked by the plates. The operation of this arrangement is similar to that described above as when a film is present, infrared energy is absorbed by the film preventing the detector for producing a signal.

In accordance with the invention, there has been provided a film sensor by which the presence or absence of film may be determined without physically touching the film and producing unwanted marks or fogging the film.

I claim:

1. Apparatus for sensing the presence or absence of X-ray film in a supply magazine of an automatic X-ray film loader, said apparatus being comprised of:
    a supply magazine having an opening;
    an infrared source for emitting infrared radiation substantially outside X-ray film spectral sensitivity;
    an infrared detector for producing a signal upon receipt of said infrared radiation,
    said source and said detector arranged to be in infrared communication with said opening;
    a mirror for reflecting through said opening said infrared radiation from said source to said detector, said source and said detector being mounted external to said magazine on one side of a film position and said mirror is arranged internal to said magazine on the other side of the film position; and
    a filter for passing infrared radiation outside the spectral sensitivity of X-ray film and blocking radiation within the spectral sensitivity of X-ray film, said filter being mounted in said opening, interposed between said infrared source and the film position.

* * * * *